United States Patent [19]

Richardson

[11] 4,261,822
[45] Apr. 14, 1981

[54] FILTER FOR DITCH PUMPS

[76] Inventor: Harry L. Richardson, 19710 Pinehurst La., Salinas, Calif. 93901

[21] Appl. No.: 89,934

[22] Filed: Oct. 31, 1979

[51] Int. Cl.³ ............................................. B01D 33/06
[52] U.S. Cl. ................................... 210/107; 210/161; 210/409
[58] Field of Search ............... 210/153, 156, 157, 158, 210/159, 161, 107, 409; 415/143, 144, 145; 405/75, 77; 73/229, 230, 231; 60/468, 494

[56] References Cited

U.S. PATENT DOCUMENTS

| 630,769 | 8/1899 | Bird | 210/157 |
|---|---|---|---|
| 788,511 | 5/1905 | Besseberg | 210/157 |
| 1,010,609 | 12/1911 | Fountain | 405/75 |
| 1,516,693 | 11/1924 | Anthony | 210/161 |
| 2,100,495 | 11/1937 | Stevonson | 73/230 |
| 2,338,487 | 1/1944 | Brichley | 210/157 |
| 2,747,403 | 5/1956 | Stevonson | 73/230 |
| 3,151,068 | 9/1964 | Long et al. | 210/156 |
| 3,242,872 | 3/1966 | Thompson | 210/158 |
| 3,550,426 | 12/1970 | Griffo | 73/230 |
| 4,017,394 | 4/1977 | Hensley | 210/157 |

Primary Examiner—Theodore A. Granger
Attorney, Agent, or Firm—Cahill, Sutton & Thomas

[57] ABSTRACT

A rotatable self-cleaning drum shaped filter is partially submerged in a source of water and encloses the inlet of a conduit connected to a ditch pump. A part of the flow of water drawn through the conduit by the ditch pump rotates a water turbine, which turbine is mechanically connected to the drum shaped filter to rotate the drum shaped filter about its longitudinal axis. Simultaneously, a plurality of stationary nozzles forcibly spray a filtering element of the drum shaped filter as the filtering element rotates therepast to remove debris from the filtering element and prevent clogging of the drum shaped filter and water starvation at the inlet to the conduit.

17 Claims, 6 Drawing Figures

FILTER FOR DITCH PUMPS

The present invention relates to water filters and, more particularly, to self-cleaning, self-rotatable filters for ditch pumps.

Water for irrigation purposes is obtained from either local wells, local open bodies of water or canals or ditches conveying water from a remote location. Where local wells are employed, the water is generally free of debris and debris filters are usually not needed. Local open water sources, such as ponds and the like usually have floating debris, debris suspended within the water or debris on the bottom which is easily disturbed by the suction of a water withdrawing conduit. Canals and ditches often have floating debris and debris suspended within the moving water. Usually, pond, canal or ditch water must be strained prior to withdrawal to prevent the debris from clogging pumps and conduits. Regardless of what kind of strainer of filtering mechanism is used to inhibit debris from entering through the inlet of a conduit withdrawing the water, means must be deployed to prevent the strainer or filtering mechanism from clogging.

Various strainers, filters and screens having self-cleaning attachments have been developed. U.S. Pat. Nos. 1,095,434, 1,143,147 and 1,544,442 illustrate drum-like screens partially submerged within and extending across a canal or a ditch. Rotation of the screens as part of a self-cleaning mechanism is effected by a paddle wheel responsive to the flow of water in the canal or ditch. Similarly, U.S. Pat. No. 4,017,394 is directed to a drum shaped strainer partially submerged within a flowing water passageway and includes paddles for rotating the strainer about its longitudinal axis in response to the water flow in the water passageway. U.S. Pat. No. 2,646,888 describes a non-transportable drum-like screen having its longitudinal axis in general alignment with the water flow. A mask supporting a screened end faces the oncoming water and the other end is open and rotation of the drum like screen about its longitudinal axis is effected by an electrical motor. U.S. Pat. No. 3,349,916 is directed to a permanently mounted drum shaped open ended screen rotatably driven by an external power source. U.S. Pat. No. 3,333,700 illustrates a cylindrical screen having a blade bearing against the screen surface for removing debris. U.S. Pat. No. 3,784,017 describes the use of a brush to clean the exterior surfaces of a rotatable strainer. U.S. Pat. No. 3,843,520 is directed to a vertically movable water level responsive filter unit having an air ejection system for effecting rotation of a cylindrically shaped filter and for discouraging deposition of debris upon the filter.

It is therefore a primary object of the present invention to provide apparatus for rotating a drum shaped filter in response to the flow of water drawn through the filter.

Another object of the present invention is to provide a water turbine for rotating a cylindrical filter in response to the flow of water from the filter to a ditch pump.

Yet another object of the present invention is to provide a self-cleaning drum shaped filter rotatable to subject the filter to cleaning action of water sprays.

Still another object of the present invention is to provide a means for continually cleaning a rotatable filter as the filter rotates in response to operation of a pump drawing water through the filter.

A further object of the present invention is to provide an inexpensive self-powered and self-cleaning filter for ditch pumps.

A yet further object of the present invention is to provide a low maintenance filter for a ditch pump.

A still further object of the present invention is to provide a readily transportable filter for ditch pumps.

These and other objects of the present invention will become apparent to those skilled in the art as the description thereof proceeds.

The present invention may be described with greater specificity and clarity with reference to the following drawings, in which:

FIG. 3 is an end view taken along lines 3—3, as shown in FIG. 1;

FIG. 4 is a cross-sectional view taken along lines 4—4, as shown in FIG. 3;

In irrigating fields from a source of water, such as a pond, canal or ditch, a ditch pump (suction pump) is used to withdraw the water and distribute it through pipes to the field. As these sources of water usually contain floating and suspended debris, a filter of some sort must be used to strain the water flowing into the inlet of a conduit leading to the pumps. Where canals or ditches are used as the source of water, it is preferable to relocate the ditch pump and water inlet filter to minimize the amount of pipes necessary to irrigate a whole field. Moreover, when the ditch pump and inlet filter are used for a plurality of fields transportability is an important factor.

Figure 1:
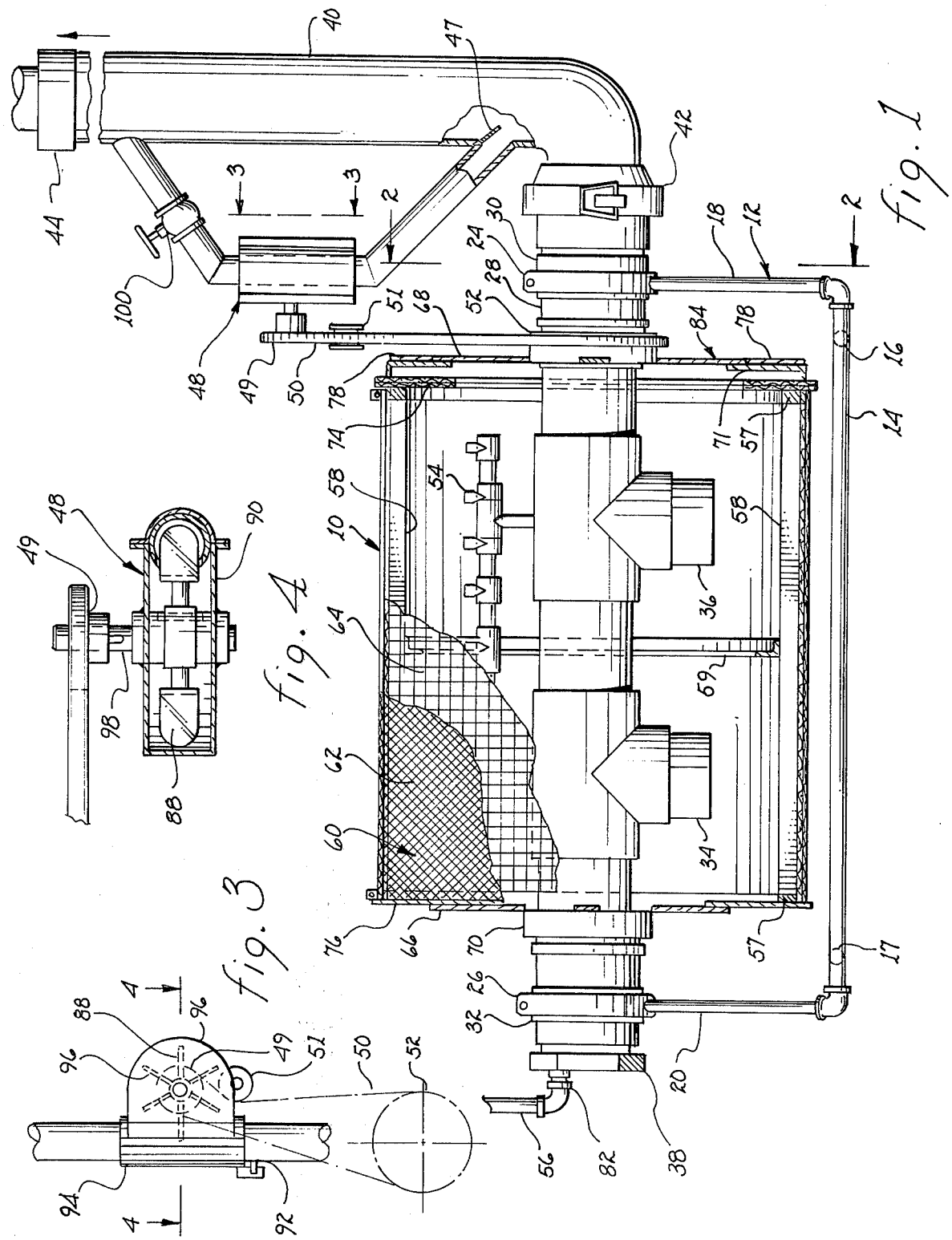
FIG. 1 is a side view of a filter for a ditch pump.

Referring to FIG. 1, there is illustrated a stand 12 for supporting a drum shaped filter 10 above the bottom of the source of water. The stand may be formed of a plurality of tubular base elements 14, 15, 16 and 17 and pairs of uprights 18, 19 and 20, 21 supporting split collars 24 and 26, respectively (see also FIG. 2). The collars support a hollow shaft 28 of the drum shaped filter at locations 30 and 32. The length of the uprights, commensurate with the size of the drum shaped filter and the water depth, are configured to maintain the drum shaped filter only partially submerged.

Downwardly directed water inlets 34 and 36 are in fluid communication with the interior of hollow shaft 28. One end of the hollow shaft is closed off by a cap 38 and the other end of the hollow shaft is in fluid communication with conduit 40 and is attached thereto by a releasable clamp 42. Conduit 40 is in fluid communication with a ditch pump 44 to draw water through inlets 34 and 36, hollow shaft 28 and conduit 40 for ultimate distribution in a field to be irrigated. The hollow shaft supports a plurality of ganged nozzles 54 in fluid communication with pipe 56, which pipe extends through cap 38.

A bypass conduit 46, connected in parallel with a portion of conduit 40, channels a flow of water through a turbine 48. A baffle plate 47 may be included to direct flow into conduit 46. Rotation of the turbine is translated through sprocket 49, chain 50, idler sprocket 51 and sprocket 52 to hollow shaft 28.

Drum shaped filter 10 includes a cylindrical structural cage of ring members 57 interconnected by longerons 58; an annular support 59 interconnecting the longerons may also be employed. A cylindrically shaped filter element 60, which element may include a fine mesh 62 supported upon a structurally robust coarse mesh 64 extends about the cylindrical cage. Ends plates 66 and 68 are attached to and extend from bosses 70, 72, respectively, of hollow shaft 28. These end plates may extend to ring members 57 or may be interconnected therewith through support bars 74 and annular screens 76, 78. As will be evident from FIG. 1, drum shaped filter 10 totally encloses inlets 34 and 36 and nozzles 54 are disposed interior thereof.

Figure 2:
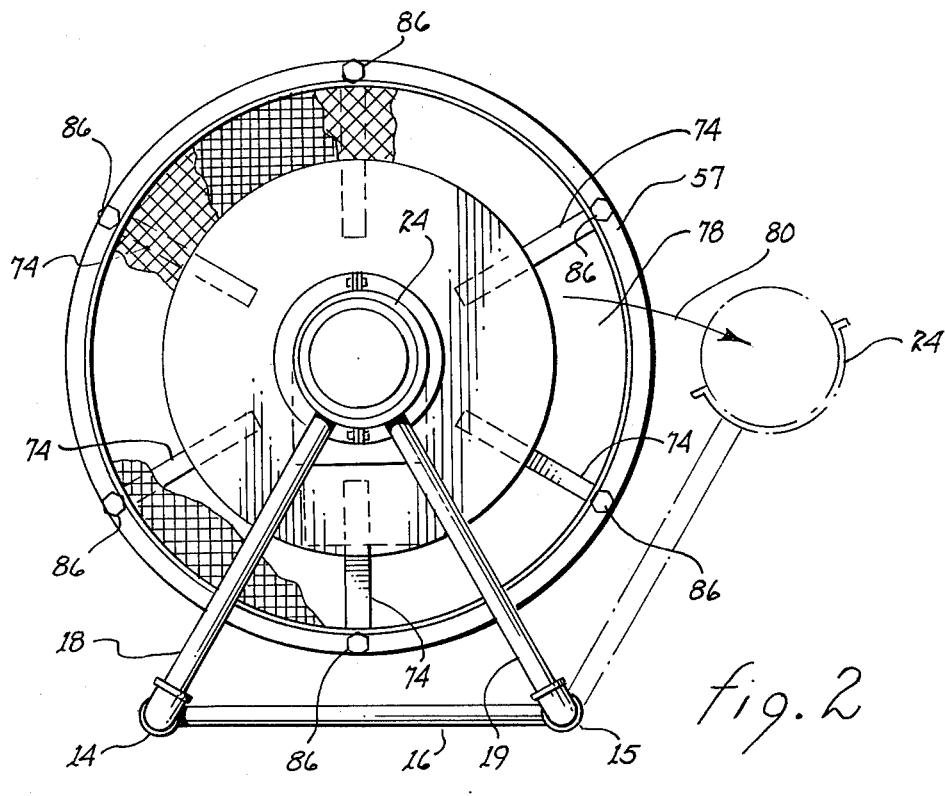
FIG. 2 is an end view taken along lines 2—2, as shown in FIG. 1.

Referring to FIG. 2, removal and replacement of the drum shaped filter from the stand will be described. Uprights 19 and 21 are pivotally secured to the extremities of base element 15. Thereby, upon disassembly of split collars 24 and 26, the uprights, with the attached half collars may be pivoted laterally, as indicated by arrow 80, to release hollow shaft 28 from the collars. After disconnection of conduit 40 by loosening clamp 42 and disconnection of pipe 56 by loosening fitting 82, or the like, filter element 60 and attached hollow shaft 28 may be removed en toto from stand 12. Access to the interior of the filter element for maintenance purposes or to disconnect the hollow shaft, may be effected by disengaging end 84. End 84 includes an annular flange 85 supporting bars 74 and screen 78 and it is removably secured to ring member 57 by bolts 86.

Referring jointly to FIGS. 1, 3 and 4, turbine 48 will be described. The turbine may be of any of several well known configurations. In the embodiment illustrated, a paddle wheel 88 is rotatably mounted within housing 90. The housing includes inlet 92 and outlet 94 interconnecting segments of bypass conduit 46 whereby the flow of water therethrough will impinge upon paddles 96 of paddle wheel 88 to effect rotation of the paddle wheel. Sprocket 49 is mounted upon a shaft 98 supporting paddle wheel 88 whereby the sprocket will rotate commensurate with rotation of the paddle wheel. A valve 100 may be disposed in bypass conduit 46 to regulate the flow of water therethrough and limit the rotational speed of the paddle wheel commensurate with a flow rate through conduit 40.

Figure 5:
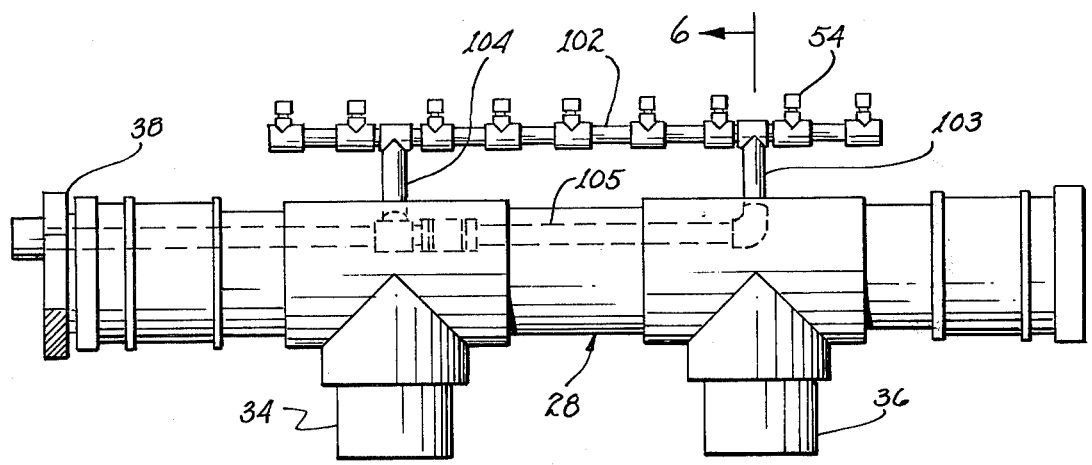
FIG. 5 is a side view of the water inlet and related apparatus.
Figure 6:
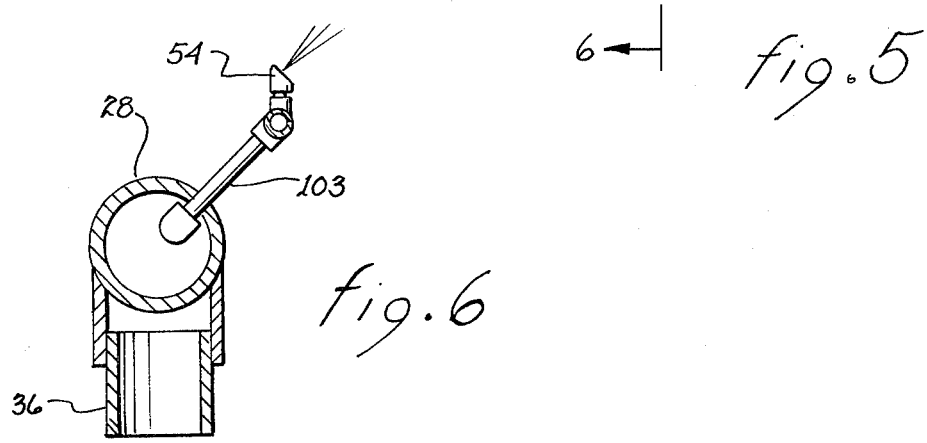
FIG. 6 is a cross-sectional view taken along lines 6—6, as shown in FIG. 5.

Referring to FIGS. 5 and 6, details of hollow shaft 28 and structure attendant thereto will be described. Nozzles 54 are interconnected through a manifold 102; the manifold is in fluid communication with inlet pipes 103 and 104 extending from inlet pipe 105. Pipe 56 is removably attached to inlet pipe 105 through fitting 82. Inlet pipe 105 is mounted interior of hollow shaft 28 and supported therein by end cap 38 and the shaft penetration junctions of inlet pipes 103 and 104.

The spray pattern of each of nozzles 54 is fan shaped and all of the patterns are oriented in a common place with slight overlap at the point at which the spray patterns impinge upon the interior surface of filter element 60. For best cleaning effect, the spray patterns should extend longitudinally across the filter element. From the above description of the water feed system to and structure of the nozzle assembly, it becomes evident that no slip joints or seals are necessary to accommodate for rotation of the filter element.

In operation, stand 12 supports drum shaped filter 10 partially submerged to maintain nozzles 54 above the water surface in a ditch, canal or other source of standing or flowing water. The only criteria for effective use is that inlets 34 and 36 be submerged to a sufficient extent to permit withdrawal of the water without lowering the water level immediately adjacent the inputs. An inflow of the water through inlets 34 and 36 is effected by the suction or low pressure at ditch pump 44 and communicated to the inlets via conduit 40. To reach inlets 34 and 36, the water must flow through the peripheral surface of filter element 60 and annular filter elements 76 and 78, if used, this flow of water, particularly if the water is contaminated with floating or suspended debris, will tend to draw and maintain the debris against the filter elements. If a buildup of debris were permitted, flow through the filter element would quickly be throttled and the flow rate to ditch pump 44 would be reduced. Once water begins to flow through conduit 40, a portion of the water flow will flow through bypass conduit 46 to the extent permitted by valve 100. The resulting flow through turbine 48 will produce rotation of paddle wheel 88 and commensurate rotation of sprocket 49. The rotation of sprocket 49 will be translated through chain 50 to sprocket 52 and effect rotation of drum shaped filter 10 about hollow shaft 28. Simultaneous therewith, a source of water under pressure connected to pipe 56 will develop a spray pattern from nozzles 54, which spray pattern impinges upon the interior of filter element 60. The source of water may be the pressure side of ditch pump 44 and connected to pipe 56 via a hose; a filter would also be included to provide clean water to the nozzles and prevent clogging of the nozzles. As the drum shaped filter rotates, the force of the spray pattern upon the filter element will tend to dislodge any debris caught or attached to the exterior surface of the filter element.

By inspection, it becomes readily apparent that rotation of the drum shaped filter is dependent only upon flow through conduit 40 and is independent of any external or auxiliary power source. Accordingly, the device may be used at remote locations provided only that it is connectable to a ditch pump 44 by means of conduit 40. The source for water under pressure fed into pipe 56 may be an independent source of water or may be supplied by the outlet of ditch pump 44 and conveyed to pipe 56 by a second conduit attached to or paralleling conduit 40. It is of course to be understood that ditch pump 44 may be a transportable self-contained pump or it may be a fixed stationary pump.

Accordingly, the present invention provides a means for withdrawing water from any ditch, canal or other source of open water irrespective of the degree or concentration of debris contained upon or suspended within the water. Moreover, the simplicity of the components along with their ease of dismantling permits ready extensive infield repairs. Thus, maintenance costs are low and the initial manufacturing costs are substantially less than that of comparable units.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Self cleaning apparatus for withdrawing filtered water from a source of water by a ditch pump, said apparatus comprising in combination:

(a) an inlet for drawing water from the source of water, said inlet being submerged in the source of water;

(b) conduit means interconnecting said inlet with the ditch pump for conveying water drawn into said inlet to the ditch pump in response to energization of the ditch pump, said conduit means including bypass conduit means for also conveying water from said inlet to the ditch pump, said bypass conduit including means for directing a flow of water from said conduit means into said bypass means, means for regulating the flow of water through said bypass conduit and a turbine responsive to the flow of water through said bypass conduit;

(c) rotatable filtering element means for filtering the water drawn into said inlet, said filtering element means being configured to preclude any substantial flow of unfiltered water to said inlet;

(d) means for maintaining a part of said filtering element continually partially exposed above the surface of the source of water during rotation of said filtering element means;

(e) means for cleaning the exposed part of said filtering element means; and (f) means for rotating said filtering element means, said rotating means being responsive to rotation of said turbine resulting from the flow of water through said bypass conduit means.

2. The apparatus as set forth in claim 1 wherein said filtering element means includes a cylindrically shaped structural cage, a filter disposed upon at least a part of the cylindrical surface defined by said cage and means for essentially precluding flow of water into the space defined by said cage except through said filter.

3. The apparatus as set forth in claim 2 wherein said inlet includes a hollow shaft disposed in the longitudinal axis of said cage.

4. The apparatus as set forth in claim 3 wherein said hollow axis includes means for rotatably supporting said cage.

5. The apparatus as set forth in claim 4 wherein said cleaning means including a plurality of water nozzles supported by said hollow shaft interior of said cage for spraying water upon the interior surface of the exposed part of said filter to dislodge debris therefrom.

6. The apparatus as set forth in claim 5 wherein said cleaning means includes pipe means for conveying water from a source of water external to said cage to said nozzles, said pipe means being disposed internal of said hollow shaft in proximity to said supporting means.

7. The apparatus as set forth in claim 4 wherein said filter includes a further filter disposed in at least one end of said cage.

8. The apparatus as set forth in claim 4 wherein said filter includes an annular shaped filter disposed in each end of said cage.

9. The apparatus as set forth in claim 2 wherein said cage includes at least one removable end for providing access to the interior of said cage.

10. The apparatus as set forth in claim 3 wherein said maintaining means comprises a stand for exposing a part of said filtering element above the surface of the water and wherein said stand includes a releasable collar for engaging a section of said hollow shaft at each end of said cage.

11. The apparatus as set forth in claim 10 wherein said stand includes means for releasing said hollow shaft from said collars to disengage said hollow shaft from said stand.

12. The apparatus as set forth in claim 4 wherein said rotating means includes means for translating the rotary motion of said turbine to rotary motion of said cage about said hollow shaft.

13. The apparatus as set forth in claim 12 wherein said translating means comprises a first sprocket attached to said turbine, a second sprocket attached to said cage and a chain interconnecting said first and second sprockets.

14. A self cleaning filtering apparatus for filtering the water drawn from a source of water into an inlet in fluid communication with a ditch pump, said apparatus comprising in combination:

(a) a rotatable filtering element for filtering the water drawn into the inlet;

(b) means for partially submerging said filtering element in the source of water;

(c) means for bypassing a point of the flow of water from the inlet to the ditch pump, said bypass means including means for urging water flow through said bypass means, a turbine responsive to the water flow through said bypass means and means for regulating the flow of water impinging upon said turbine;

(d) means response to said turbine for rotating said filtering element to continually expose a part of said filtering element; and (e) means for cleaning the exposed part of said filtering element commensurate with rotation of said filtering element.

15. The apparatus as set forth in claim 14 wherein said rotating means includes means for translating the rotary motion of said turbine to rotary motion of said filtering element.

16. The apparatus as set forth in claim 15 wherein said turbine includes a paddle wheel.

17. The apparatus as set forth in claim 16 wherein said translating means includes a first sprocket operatively connected to said paddle wheel, a second sprocket operatively connected to said filtering element and a chain interconnecting said first and second sprockets.

* * * * *